(No Model.)
R. N. CAUGHELL.
SPOKE EXTRACTOR.
No. 293,307. Patented Feb. 12, 1884.
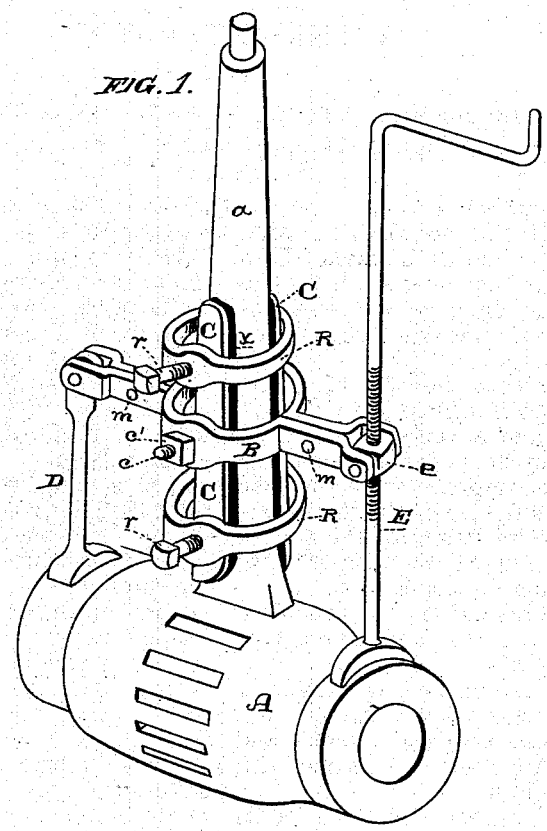
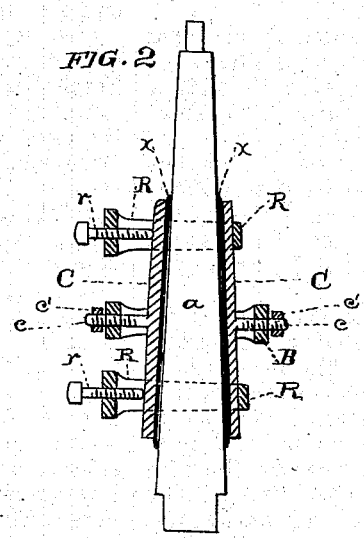
Witnesses:
Geo. H. Strong.
Inventor,
R. N. Caughell
By Dewey & Co.
Attorneys

UNITED STATES PATENT OFFICE.

ROBERT NELSON CAUGHELL, OF SHEDD, OREGON.

SPOKE-EXTRACTOR.

SPECIFICATION forming part of Letters Patent No. 293,307, dated February 12, 1884.

Application filed September 25, 1883. (No model.)

*To all whom it may concern:*

Be it known that I, ROBERT N. CAUGHELL, of Shedd, county of Lime, and State of Oregon, have invented an Improvement in Spoke-Extractors; and I hereby declare the following to be a full, clear, and exact description thereof.

My invention relates to the class of spoke-extractors the object of which is to remove spokes from the hub of a wheel.

My invention consists in certain details of construction made as improvements upon the parts of that certain device of this nature secured to me by Letters Patent of the United States No. 277,991, dated May 22, 1883, to which reference is hereby made.

The object of my invention is to provide a more perfect spoke-extractor, both in construction and in operation.

Referring to the accompanying drawings, Figure 1 is a perspective view of my extractor, showing its application to a spoke and hub. Fig. 2 is a vertical section of same, with the omission of the hub.

A is the hub of a wheel, and $a$ one of its spokes.

B is the pivoted ring-lever clamped upon the spoke by means of jaws C.

D is the fulcrum-bar, pivoted in one arm of the ring-lever and bearing on the hub.

E is the power-screw, working through a pivoted nut, $e$, in the other arm of the ring-lever and bearing against the hub.

The operation of these parts I need but briefly explain. In this device the spoke is the weight, and it is between the power E and fulcrum D. The operation of the screw E, acting against the fulcrum D, draws the spoke $a$.

In my former patent the clamping-jaws were short, and were operated by set-screws tapped into the main lever. This necessitated the pivoting of the jaws on the screws, that the ring-lever might be operated as it had to swing. In my present extractor I make the clamping-jaws C long, and provide their inner or bearing surfaces with padding $x$. The centers of the jaws are made with outwardly-extending trunnions $c$, upon which the ring-lever B is pivoted. Their outer ends are threaded and receive nuts $c'$, whereby the ring-lever is held in place. In order to clamp the jaws to the spoke, I have secured to one of them, above and below, the rings R, through which pass the set-screws $r$, bearing against the other jaw.

The ring-lever B, I make in two parts, and rivet them together at $m$.

The advantages to be gained by these improvements I may sum up as follows: The long jaws with the two clamping-rings afford a much greater gripping-surface, and enable me to fasten the extractor upon the spoke without slipping, notwithstanding that the jaws are padded. The padding of the jaws prevents them from injuring the varnish on the most highly finished spoke. By means of the nuts $c'$, I am enabled to center the ring-lever upon different-sized spokes. By making the said lever in two parts, a saving in labor results in the manufacture of the device. Dispensing with the clamping-screws in center of the ring-lever allows it to pivot on the trunnions of the jaws, instead of, as heretofore, causing the screws themselves to pivot in the jaws. This insures the pulling of the spoke straight, whereby no injury can result to the tenon of the spoke, nor to the mortise of the hub. The ring-lever is also thereby relieved of much strain, which enables me to make it strong enough in two parts, and fastening them together by light rivets.

Having thus described my invention, what I claim as new, and desire to secure by Letters Patent, is—

1. In a spoke-extractor, the ring-lever B, the pivoted fulcrum-bar D, and screw-power E, in combination with the long jaws C, having trunnions $c$, upon which the ring-lever is pivoted, the nuts $c'$, and means for clamping said jaws on the spoke, substantially as herein described.

2. In a spoke-extractor, the ring-lever B, the pivoted fulcrum-bar D, and screw-power E, in combination with the long jaws C, having trunnions $c$, upon which said ring-lever is pivoted, and the means for clamping said jaws to the spoke, consisting of the rings R, secured above and below to one jaw, and the set-screws $r$, passing through said rings and impinging on the other jaw, substantially as herein described.

In witness whereof I have hereunto set my hand.

ROBERT NELSON CAUGHELL.

Witnesses:
GEO. W. DAVIS,
F. A. WATTS.